United States Patent [19]
Younie et al.

[11] Patent Number: 5,817,269
[45] Date of Patent: Oct. 6, 1998

[54] COMPOSITE FABRICATION METHOD AND TOOLING TO IMPROVE PART CONSOLIDATION

[75] Inventors: Mark L. Younie, Seattle; Daniel J. Kovach, Kent; Jeffrey C. Bower, Seattle; James T. Nishimura, Auburn, all of Wash.

[73] Assignee: The Boeing Company, Seattle, Wash.

[21] Appl. No.: 738,263

[22] Filed: Oct. 25, 1996

[51] Int. Cl.$^6$ .............................. B29C 33/00; B29C 43/10
[52] U.S. Cl. .............................. 264/258; 264/313; 249/82
[58] Field of Search .................................. 264/258, 313; 249/82, 178; 425/77, 405.2, 417, 419

[56] References Cited

U.S. PATENT DOCUMENTS

| | | |
|---|---|---|
| 1,802,815 | 4/1931 | Hilton . |
| 2,298,839 | 10/1942 | Porter . |
| 2,477,852 | 8/1949 | Bacon . |
| 2,593,714 | 4/1952 | Robinson . |
| 3,080,268 | 3/1963 | Bjork . |
| 3,165,569 | 1/1965 | Bright ..................................... 264/313 |
| 3,391,511 | 7/1968 | Harris et al. . |
| 3,590,590 | 7/1971 | Vujasinovic . |
| 3,664,906 | 5/1972 | Hartig . |
| 3,673,057 | 6/1972 | Fairbanks . |
| 4,126,719 | 11/1978 | Koyanagi et al. . |
| 4,171,999 | 10/1979 | Allen . |
| 4,242,161 | 12/1980 | Hultén et al. . |
| 4,448,628 | 5/1984 | Stott . |
| 4,450,661 | 5/1984 | Whitener . |
| 4,512,837 | 4/1985 | Sarh et al. . |
| 4,524,556 | 6/1985 | Sarh et al. . |
| 4,557,090 | 12/1985 | Keller, Sr. . |
| 4,633,632 | 1/1987 | Sarh . |
| 4,683,099 | 7/1987 | Buxton et al. ............................ 264/258 |
| 4,717,330 | 1/1988 | Sarh . |
| 4,721,593 | 1/1988 | Kowal . |
| 5,204,042 | 4/1993 | James et al. ............................. 425/417 |
| 5,217,669 | 6/1993 | Dublinski et al. . |
| 5,286,438 | 2/1994 | Dublinski et al. . |
| 5,597,435 | 1/1997 | Deautes et al. .......................... 264/258 |

FOREIGN PATENT DOCUMENTS

| | | |
|---|---|---|
| 0572248A1 | 12/1993 | European Pat. Off. . |
| 60-139433 | 7/1985 | Japan . |

*Primary Examiner*—Richard Crispino
*Attorney, Agent, or Firm*—Christensen O'Connor Johnson & Kindness PLLC

[57] ABSTRACT

An method and tooling concept for fabricating complex composite parts is provided. The method and tooling concept use various tooling configurations in order to produce varying magnitudes of thermal expansion at different areas within the tooling concept. The varying magnitudes of thermal expansion allow the tool concept to account for varying magnitudes of tool movement needed to debulk and consolidate varying thickness areas of the composite workpiece being cured. The tooling concept is formed of different materials having different thicknesses that allow the tooling concept to produce varying magnitudes of thermal expansion. The exterior surface of the tooling concept is covered by a compliant covering. The compliant covering helps to equalize the consolidation pressures produced by the tooling concept during curing. A composite wing box structure fabricated using the method and tooling concept is also disclosed.

9 Claims, 10 Drawing Sheets

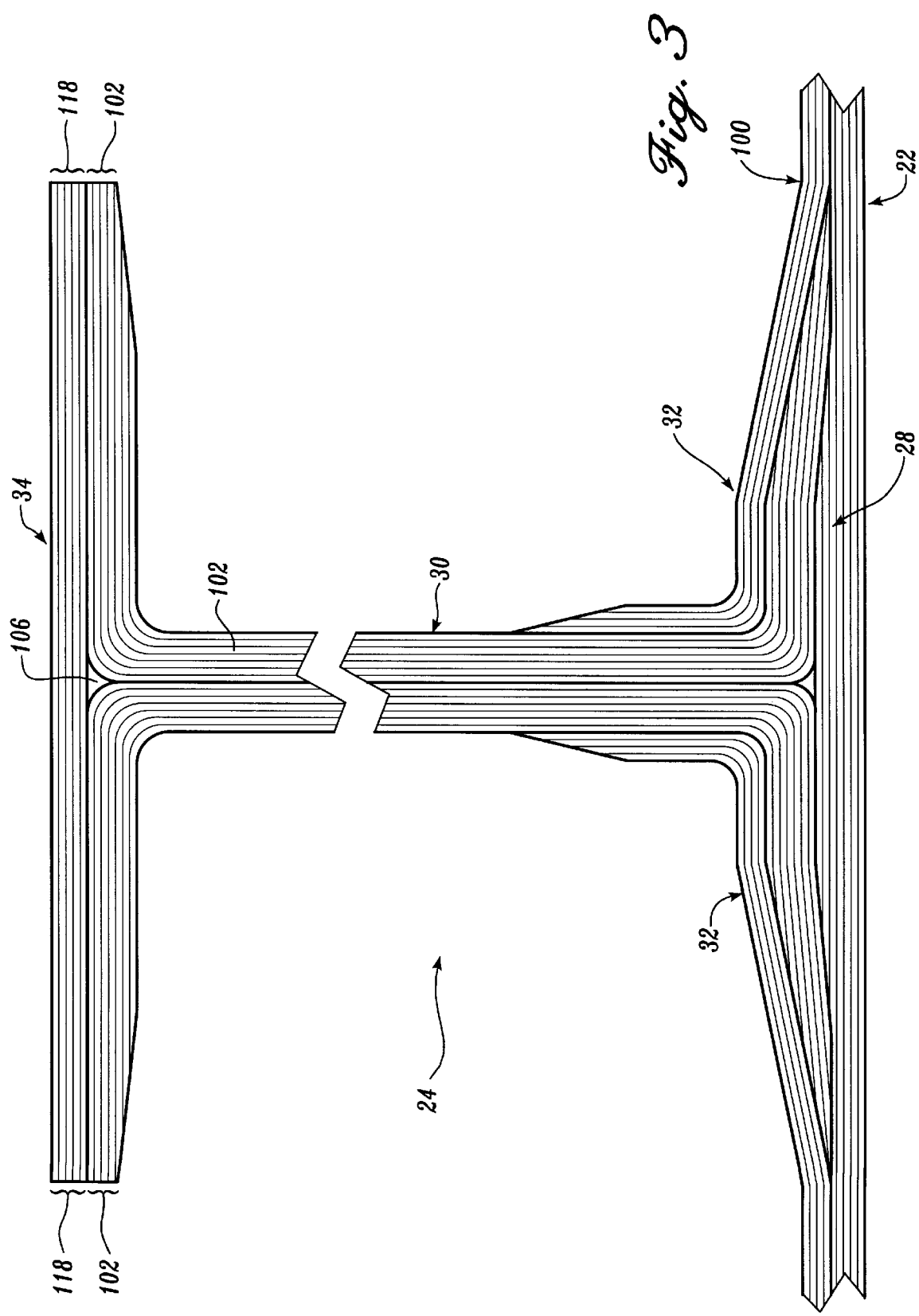

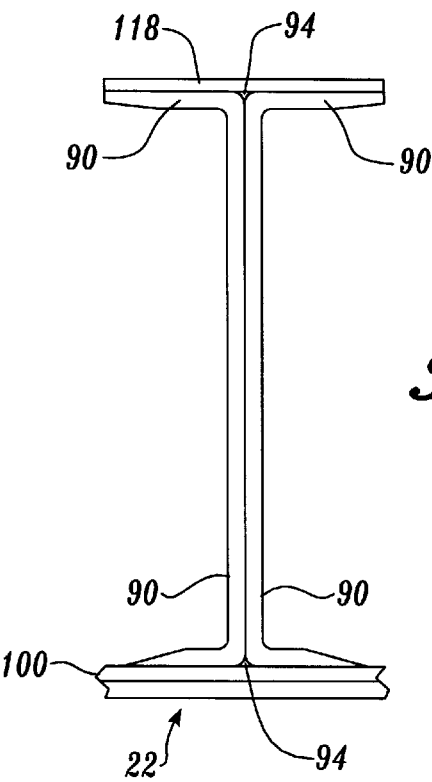
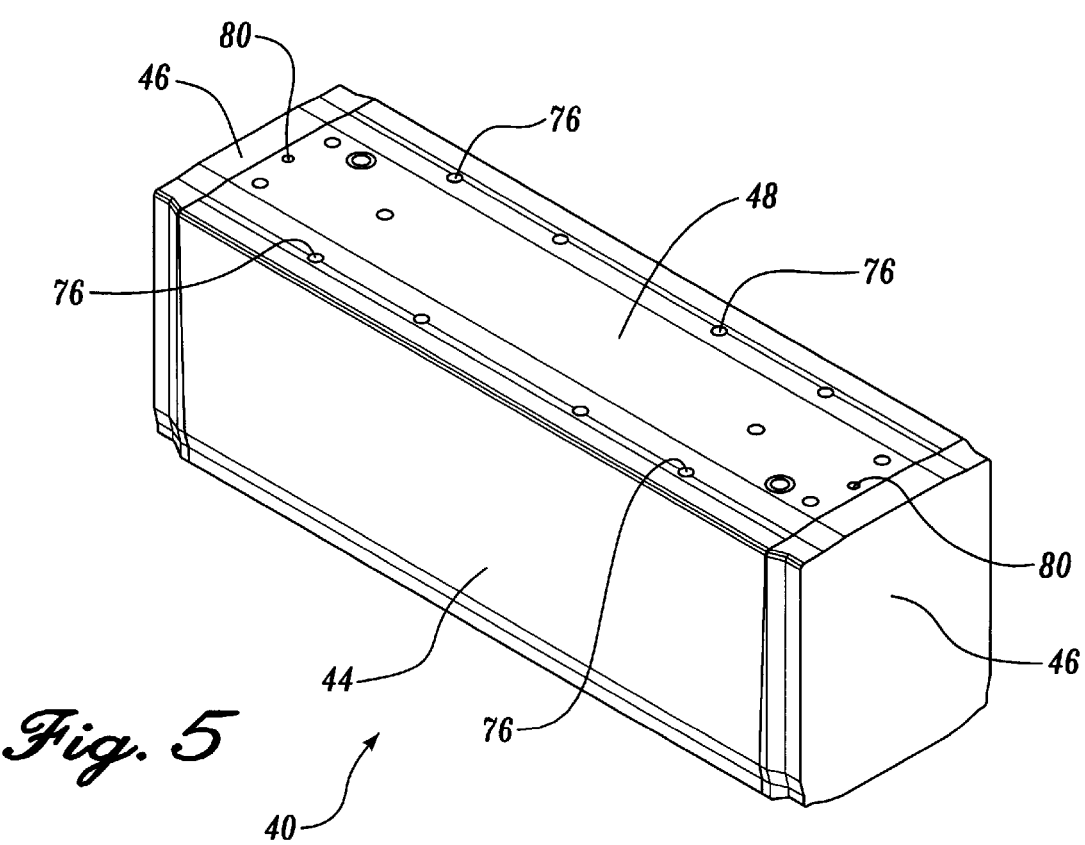

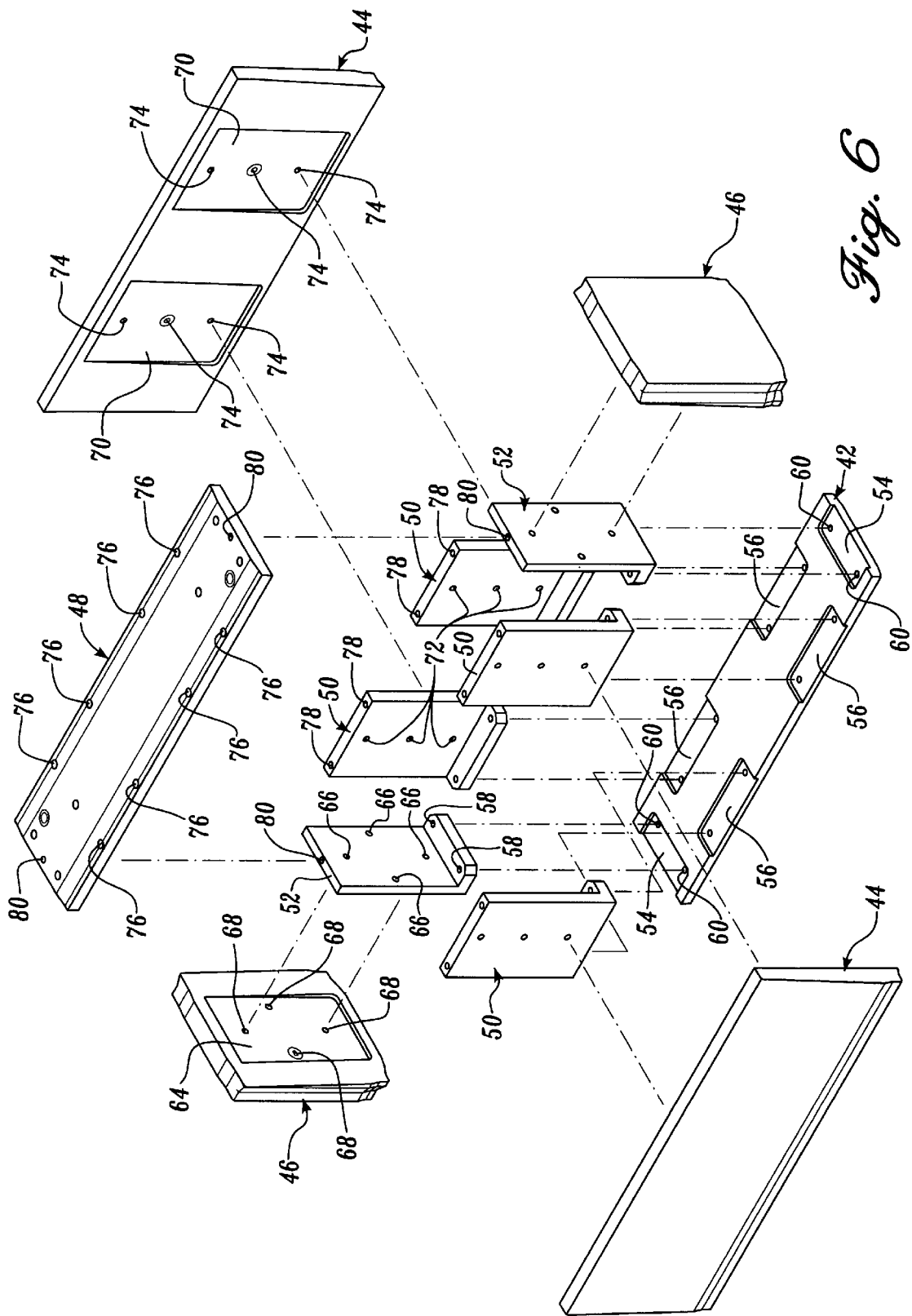

5,817,269

COMPOSITE FABRICATION METHOD AND TOOLING TO IMPROVE PART CONSOLIDATION

FIELD OF THE INVENTION

The present invention relates to methods and apparatus for forming structures from composite materials.

BACKGROUND OF THE INVENTION

The use of composite materials in the manufacture of aircraft and other lightweight structures has increased steadily since the introduction of such materials. Composite materials have a high strength-to-weight ratio and high stiffniess, making them attractive for use in lightweight structures. Two drawbacks to using composite materials are their high fabrication costs and low damage tolerance. It is difficult to produce composite parts for the same cost and having the same degree of damage tolerance as comparable metal parts. This cost differential is especially notable in large scale composite parts having complex contours.

Some contributors to the cost of composite structures are the amount of manual labor required during fabrication and the cost of the complex tools generally used to form composite parts having complex geometries. Complex parts having complex geometries, for example, aircraft wing boxes, are generally formed by manually laying up individual layers of composite material on a contoured mandrel to form the exterior skin of the wing box. The spars and ribs of the wing box are generally formed separately by manually laying up individual layers of composite material on a series of different tools in order to form individual I-beam or sine wave spars and ribs. The sine wave spars or ribs are generally vacuum bagged and precured as separate components within an autoclave under elevated temperatures and pressures. After curing, the sine wave spars and ribs are then placed on the laid up outer skin of the wing box and subsequently adhesively bonded to the skin in an autoclave operation in which the skin, spars and ribs are placed in a vacuum bag and cured at an elevated temperature and pressure. In order to insure good structural integrity between the spars, ribs and skin, "chicken fasteners" are generally used to reinforce the spar/rib-skin interface.

In order to decrease fabrication costs and increase structural integrity, it has been found advantageous to join the spars and ribs to the skin prior to curing the individual composite substructures. The skin and joined ribs and spars are then vacuum bagged with appropriate tooling and co-cured together in a single autoclave operation. This method of fabrication eliminates the separate curing cycles required to form individual composite subassemblies and subsequently join them to form the wing box structure. However, currently it is difficult to properly design and fabricate appropriate tools to jointly cure complex structures while maintaining structural tolerances and minimizing or eliminating areas of resin porosity or resin richness.

One of the problems associated with past tooling designs is the inability of the tooling to place appropriate consolidation pressures on all of the regions of a complex part during curing, thus leading to areas of resin richness or resin porosity. Generally, past tooling concepts have been formed of various materials such as Invar 42 or composite materials that have similar coefficients of thermal expansion as the composite material from which the part is being formed. Matching the coefficients of thermal expansion between the tooling materials and the composite material from which the part is formed is thought to reduce problems associated with thermal expansion mismatches during part curing.

Prior tooling concepts, even those using tools formed from materials having similar coefficients of thermal expansion as the composite materials, often fail to achieve complete part consolidation. Consolidation problems are complicated in composite parts where not only must complete consolidation be achieved, but also part dimensional tolerances must be carefully controlled. Part tolerances are increasingly important in parts having both exterior mold line surfaces and interior ribs, spars or flanges whose geometry and locations must be carefully controlled.

Generally, prior tooling concepts for use in complex composite parts have relied upon matched metal tooling. However, if any surface of such matched metal tooling is even slightly off, the result is often unacceptable parts having areas of resin richness or resin porosity. Alternatively, complex metal tools incorporating indexing substructures have been used. As with matched metal tooling, such tooling often fails to produce high quality composite parts. In addition, the complexity of most such prior tooling concepts has resulted in expensive tools that contribute to the overall costs of the composite parts being produced.

One of the contributions to resin richness and resin porosity in cured composite parts is the large difference between the uncured and cured dimensions of the composite part. Because composite parts are formed of many layers of composite material that are joined together and then, consolidated and cured, the laid up but uncured composite workpiece has a much greater volume than the fully compacted and cured composite workpiece. This changing volume and thus part thickness during curing is complicated by the fact that the magnitude of compaction-consolidation of the composite workpiece differs at different areas within the workpiece due to the varying number of layers of composite material used to form different areas of the workpiece.

Prior tooling concepts are configured to account for the thermal expansion of the composite tools and the composite workpiece during curing. However, such tooling concepts fail to account for the varying magnitudes of compaction/consolidation required at different areas in the composite workpiece. Thus, prior tooling has been used very successfully to form composite parts having approximately constant thicknesses, but has not been used as successfully to form composite parts having varying thicknesses and close tolerances on the surfaces of the part.

As can be seen from the above discussion, there remains a need in the industry for improved composite fabrication methods and apparatus. The present invention is directed toward composite fabrication methods and apparatus that fulfill part of this need.

SUMMARY OF THE INVENTION

The present invention is a tooling concept and tooling method that produces high quality, complex composite parts. In one method of the invention, the desired geometry for the completed composite parts is first determined. Using known consolidation parameters, the unconsolidated geometry of the unconsolidated and uncured workpiece used to form the composite part is then calculated. The resin gelation temperature of the composite material from which the composite part is to be formed is also determined. The difference between the resin gelation temperature and the temperature at which the composite part is to be laid up is then calculated. The temperature difference and the known coefficients of thermal expansion of materials used to form the tooling concept are then used to configure a tooling concept that has the proper thermal expansion characteristics to form the unconsolidated geometry of the workpiece into the cured geometry of the composite part during curing.

In accordance with other aspects of the invention, the tooling concept is configured so that different areas of the tooling concept produce different magnitudes of thermal expansion during curing of the composite part. The different magnitudes of thermal expansion produced by the tooling concept produce the varying magnitudes of tooling movement needed to fully consolidate areas of the composite part having different unconsolidated and consolidated thicknesses.

In accordance with still further aspects of the invention, the tooling concept is formed of both a compliant material and a rigid material. The compliant material is used to cover the forming exterior surface of the rigid material. The compliant material has a relative high coefficient of thermal expansion as compared to the lower coefficient of thermal expansion of the rigid material. In one embodiment, the compliant material is formed at least partially of silicone rubber.

In accordance with still other aspects of the invention, the tooling concept is formed of multiple materials having different coefficients of thermal expansion. Various areas of the tooling concept can also be formed of varying thicknesses in order to produce varying magnitudes of thermal expansion during curing of the composite part.

In accordance with other aspects of the invention, a composite wing box is formed using the method of the present invention.

Prior tooling designs have generally been unable to consistently produce high quality, complex composite structures free of areas of resin porosity or resin richness. Typically, prior art tooling solutions have relied upon a combination of the thermal expansion characteristics of metal tools combined with the pressures produced by the autoclave during curing to consolidate and cure the composite parts. Such prior tooling concepts rely upon the thermal expansion characteristics of tools produced from a single tooling material. Such tooling concepts have generally been successfully used to fabricate composite parts having relatively uniform thicknesses. However, such tooling concepts have not been as successful when used in the complex composite parts having multiple thicknesses.

The use of tooling concepts according to the present invention allow multiple tooling materials having different thermal expansion characteristics to be incorporated into a uniform tooling design. Using multiple materials having differing thermal expansion coefficients allows tools, according to the present invention, to be carefully tailored to overcome problems presented by complex composite parts. Thus, through the use of the present invention, the tooling can be designed to provide increased thermal expansion in areas of the composite part that require it and lower magnitudes of thermal expansion in areas that do not require as much tool expansion to produce good part consolidation.

Because both the unconsolidated and consolidated dimensions of the composite part can be approximately determined prior to curing, tooling concepts according to the present invention can be carefully designed to account for the differences in geometry in the composite part both before curing and after curing. Thus, carefully designed tooling concepts according to the present invention can produce approximately a hydrostatic force over the surface of the composite part. The production of the near hydrostatic force results in the production of consistent composite parts with reduced areas of resin richness or resin porosity.

Carefully configuring tooling concepts according to the present invention also allows the forces applied by the tools to the composite workpiece to be carefully balanced on each side of the composite part being formed. Balancing the forces produced by the tools during consolidation and curing allows tooling concepts according to the present invention to produce composite parts having the close tolerances required in today's aerospace industry.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is an enlarged cross-section of a portion of one of the spar/skin interfaces of the wing box of FIG. 1;

FIG. 4 is a cross-section of a portion of the wing box of FIG. 1, along line 4—4;

FIG. 5 is a perspective view of a fully assembled tooling concept according to the present invention;

FIG. 6 is an exploded view of the tooling concept of FIG. 5;

DETAILED DESCRIPTION OF THE PREFERRED EMBODIMENTS

Figure 1:
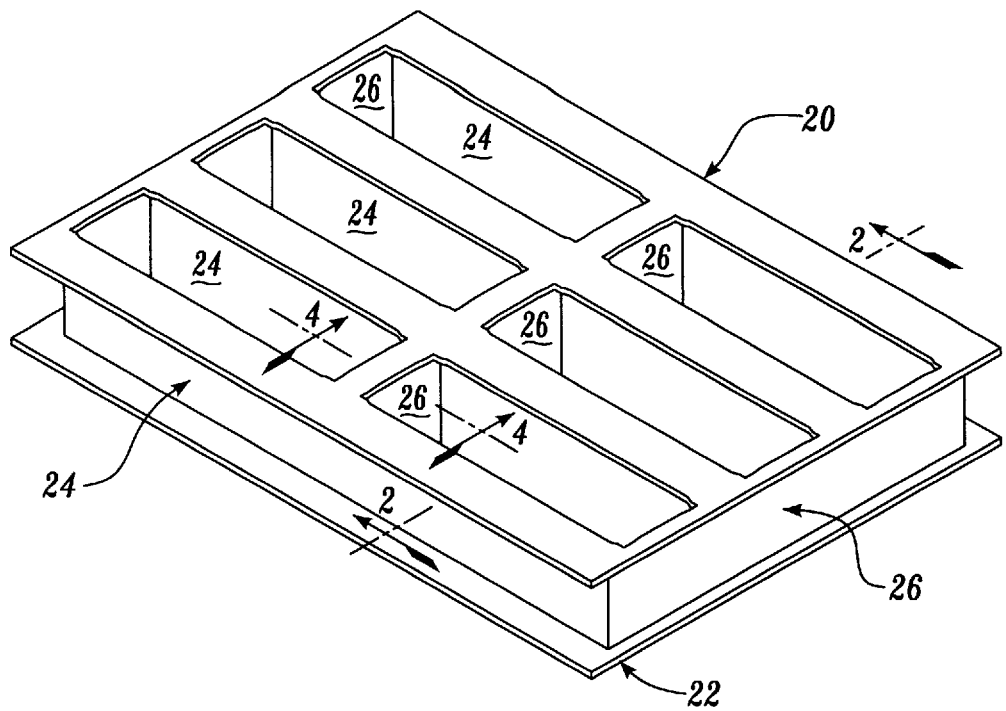
FIG. 1 is a perspective view of a composite wing box fabricated in accordance with the present invention.
Figure 2:
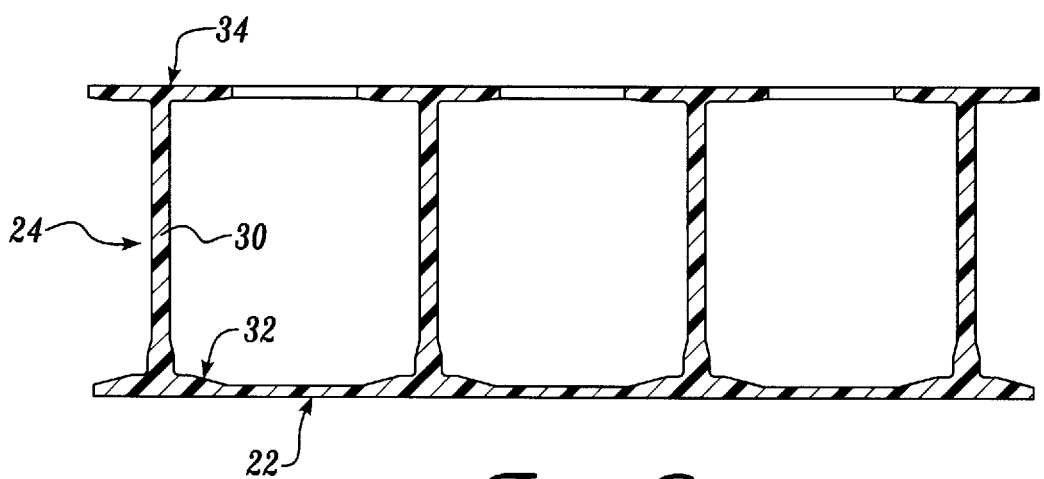
FIG. 2 is a cross-section of the wing box of FIG. 1 along line 2—2.
Figure 11:
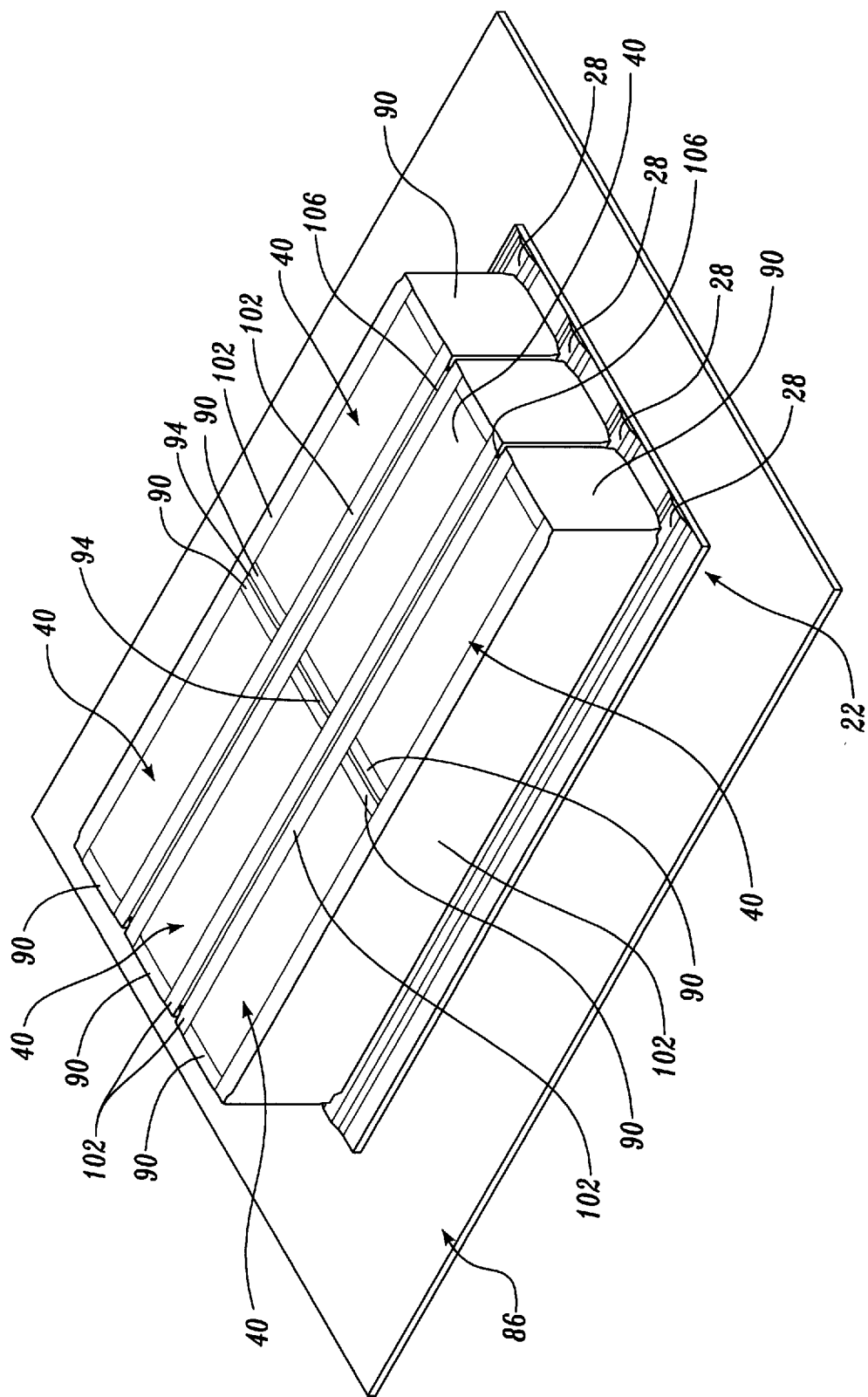
FIG. 11 is a perspective view of a number of assembled tooling concepts placed on a composite outer skin sheet.

FIG. 1 illustrates a wing box 20 formed in accordance with the present invention. The wing box 20 includes an outer skin panel 22, four parallel spars 24 extending the length of the wing box, and three parallel ribs 26 extending the width of the wing box. As illustrated in FIGS. 2, 3 and 11, the outer skin panel 22 includes a pad up or built up section 28 in the region of the attachment between the bottom of each spar 24 and the outer skin panel 22. Each spar 24 includes a central shear web 30 (FIG. 3), a lower reinforced structural buildup section 32 and an upper spar cap 34.

As will be described in more detail below, the structural buildup sections 32 are located on opposing sides of each shear web 30 adjoining the intersection between the bottom of each central shear web 30 and the outer skin panel 22. The structural buildup sections 32 are formed of individual layers of either unidirectional or cloth composite prepreg materials. The shear webs 30 extend upward from the outer skin panel 22 approximately normal to the plane of the outer skin panel. The spar caps 34 are located at the top of each shear web 30 and extend outward from opposing sides of the shear web approximately normal to the plane of the shear web.

As will be discussed below, the outer skin panel 22, spars 24, and ribs 26 are all formed of individual layers of composite prepreg that are joined together in a fabrication process to form a composite workpiece that is then cured to form a composite part, such as wing box 20. The various layers of composite material used to form the composite workpiece can be formed from either cloth, composite prepreg, or unidirectional composite prepreg materials. Prepreg composite materials contain both reinforcing fibers and a matrix material such as a thermosetting polymer (e.g. epoxies) or thermoplastic polymer (e.g. polyether-Imide).

The specific types of composite materials used to fabricate the wing box 20, including the type of matrix material used, the type of reinforcing fiber used, whether the materials are prepregs of unidirectional or cloth materials, whether the materials incorporate dry cloth, etc., and how many layers of composite material are used to form each section of the wing box 20, all differ depending upon the specific application and type of composite part being formed. Therefore, the present invention is discussed below with respect to an exemplary wing box 20. However, the present invention may be used to form various composite parts having varying geometries and being fabricated from varying composite material systems.

As discussed briefly in the background of the invention, depending upon the application, it is important to maintain close structural tolerances on various sections of the wing box 20. Such close tolerances are used to achieve both proper part fit and good part quality. For example, in the wing box 20, it is important to maintain good part consolidation throughout the structure of the wing box in order to insure good material properties. It is also important to maintain close part tolerances on the outer surface of the outer skin panel 22 since the surface would be subject to aerodynamic considerations in a complete wing. In addition, in the wing box 20 it is important to closely maintain the positional geometry of the various spars 24 and ribs 26 in order to insure that such structures will mate correctly with additional parts of a completed wing, such as wing skins, bulkheads, etc. (not shown). The problems associated with achieving good consolidation throughout the wing box 20 are complicated by the fact that the various sections of the wing box are formed from a different number of layers of composite material and thus have varying preconsolidated and post-consolidated thicknesses. During consolidation it is important that the tooling concept used to position and cure the various sections of the composite workpiece used to form the wing box 20 be able to account for varying changes in thickness in sections of the wing box and to account for the varying magnitudes of tool movement needed to properly consolidate and cure the variable thickness sections of the wing box.

For example, the central shear webs 30 of the spars 24 may be formed of fourteen layers of composite prepreg having a debulked but unconsolidated thickness of approximately 0.196 inches, while the thickness of the composite workpiece in the region of the structural buildup section 32 may be formed of forty-five layers of composite material having a debulked but unconsolidated thickness of approximately 0.441 inches. However, upon consolidation, the central shear web 30 has a consolidated thickness of approximately 0.150 inches and the structural buildup section 32 has a consolidated thickness of approximately 0.410 inches. Thus, any tooling concept used to cure the composite workpiece should account for a change in thickness from unconsolidated to consolidated that is approximately 2.7 times as great in the structural buildup section 32 as in the center of the central shear web 30.

As recognized by the invention, one method of reducing problems associated with part consolidation is to produce a tooling concept capable of applying approximately a hydrostatic pressure over the entire part while also maintaining part tolerances. One tooling concept according to the present invention utilized to produce varying amounts of tooling expansion that results in approximately a hydrostatic force is illustrated in FIGS. 5 and 6. The tooling concept 40 includes a bottom tool 42 (FIG. 6), opposing side tools 44, opposing end tools 46, and a top tool 48. The exterior surface of each of the bottom, side, end and top tools 42, 44, 46 and 48 is contoured to serve as a forming surface to impart the desired shape to the composite workpiece during curing.

In the preferred embodiment, the bottom, side, end, and top tools 42, 44 46 and 48 are formed of a rigid material such as aluminum. In the present invention, it is advantageous to form the tools from a material that has a greater coefficient of thermal expansion than the composite material from which the part is to be formed. This allows the tooling to expand during heating more than the composite material forming the workpiece, thus allowing the expansion of the tooling to compact and help to consolidate the composite material.

The bottom, side, end, and top tools 42, 44, 46 and 48 are held together using two pairs of opposing side tool mounts 50 and a pair of opposing end tool mounts 52. Both the side tool mounts 50 and the end tool mounts 52 are generally L-shaped, having the lower leg of the "L" extending inward from the inner surface of the upward extending leg of the "L." Each of the side tool mounts 50 and end tool mounts 52 is indexed and bolted to the bottom tool 42. As illustrated in FIG. 5, the bottom tool 42 includes two opposing end recesses 54 and two pairs of opposing side recesses 56. The end and side recesses 54 and 56 are generally rectangular and are sized to accommodate the lower legs of the end tool mounts 52 and side tool mounts 50. Each of the side tool mounts 50 and end tool mounts 52 is indexed and fastened into the respective recesses 54 and 56 using fasteners such as bolts (not shown). Two bolts are used for each tool mount. The bolts extend through holes such as holes 58 in the lower leg of the end tool mount 52 and are received in holes such as holes 60 within the end recess 54.

When fastened in place, the upward extending legs of the side tool mounts 50 and end tool mounts 52 extend upward from the plane of the bottom tool 42 approximately perpendicular to the plane of the tool. The exterior side of each of the side tool mounts 50 and end tool mounts 52 extends slightly outward from the corresponding edges of the bottom tool 42 when the tool mounts are fastened to the bottom tool.

As illustrated in FIG. 6, the interior surface of each of the end tools 46 includes a rectangular recess 64 that is shaped and sized to accommodate the associated upward extending leg of the respective end tool mount 52. Each of the end tools 46 is indexed and bolted to the respective end tool mount 52 using two fasteners such as bolts (not shown) and two indexing pins that extend through four holes such as holes 66 in end tool mount 52 and are received into holes such as holes 68 in the end tool 46.

The interior surface of each of the side tools 44 includes two rectangular recesses 70 that are sized and shaped to accommodate the upward extending legs of the associated side tool mounts 50. The side tools 44 are indexed and attached to the side tool mounts 50 using fasteners such as bolts and indexing pins (not shown) that extend through holes such as holes 72 in side tool mounts 50 and are received within holes such as holes 74 in the side tool 44. The top tool 48 is fastened to the top of the side tool mounts 50 and end tool mounts 52 using fasteners such as bolts (not shown) that extend through holes such as holes 76 located along the edges of the top tool 48 and are received within holes 78 in the top of the side tool mounts 50. Similarly, the opposing ends of the top tool 48 are fastened to the end tool mounts 52 using fasteners such as bolts (not shown) that extend through holes 80 in the ends of the top tool 48 and are received within holes 80 in the tops of the end tool mounts 52. Location of top tool 48 is established by assembly within the boundaries created by the upper surfaces of side tools 44 and end tools 46 when assembled to their respective end tool 52 and side tool 50 mounts.

The tooling configuration illustrated in FIG. 6 allows the fit of the bottom tool 42, side tools 44, end tools 46, and top tools 48 to be individually indexed in order to insure proper dimensional tolerances. For example, the individual fasteners connecting the various tools and tool mounts may be adjusted in order to make small fit up adjustments for proper indexing.

Figure 7:
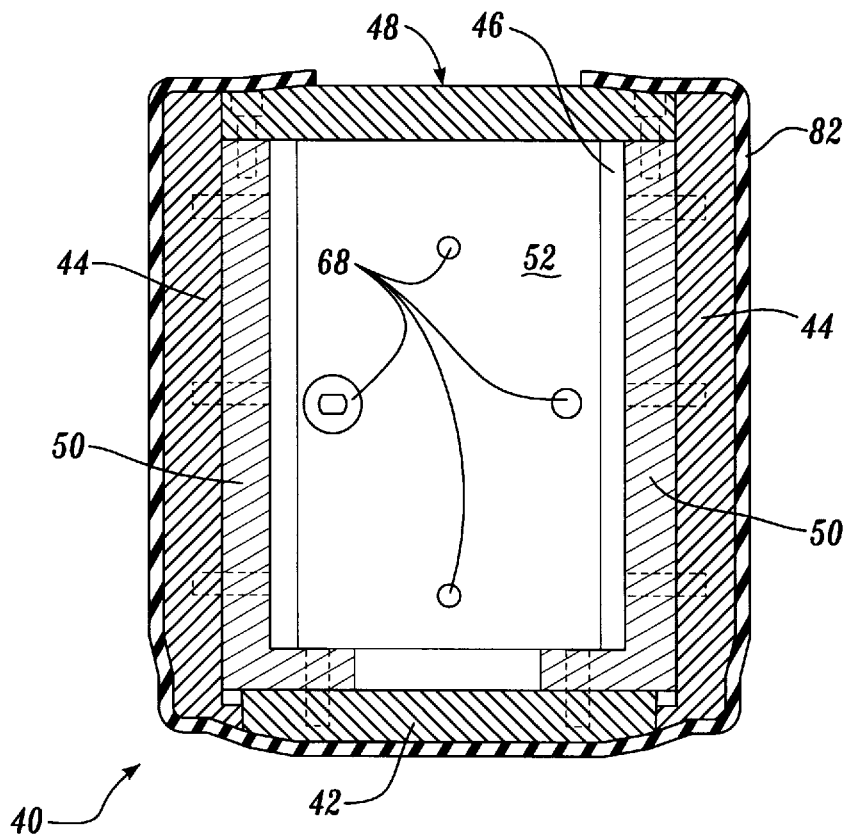
FIG. 7 is a cross-section of the assembled tooling concept of FIG. 5.

As illustrated in FIG. 7, in addition to the use of the various tools and tool mounts described above, the tooling concept 40 also includes a compliant exterior cover 82. The compliant exterior cover 82 covers the exterior surfaces of the side tools 44 and bottom tool 42 and also extends around and covers a portion of the sides and ends of the top tool 48 a sufficient amount to cover the portions of the tooling concept that are to come in contact with the composite workpiece that ultimately forms the wing box 20.

In the preferred embodiment, the compliant exterior cover 82 is formed of a material that has a much greater coefficient of thermal expansion than the materials from which the tools of the tooling concept 40 are formed. The greater coefficient of thermal expansion of the compliant cover assists the compliant cover in helping to compact and consolidate the composite material during curing. In addition, as described in more detail below, the expansion of the compliant cover also helps to eliminate pressure peaks and valleys produced by the tooling concept on the composite material during curing.

As will be described in more detail below, the cover 82 is formed of a pliable material that expands at elevated temperatures. Some exemplary materials from which to form the compliant exterior cover 82 include high temperature silicone rubber materials. In FIG. 7 the compliant cover 82 is shown to have approximately a constant cross-sectional thickness. However, as will be described in more detail below, the compliant exterior cover 82 may be tailored to have varying thicknesses at different locations in the tooling concept.

In the preferred embodiment, the compliant exterior cover 82 is formed by first fabricating a female tool having an interior forming surface that corresponds with the desired exterior surface of the compliant exterior cover 82. The assembled tooling concept 40 is then lowered into the female mold and silicon rubber or other appropriate materials are then poured or injected into the mold around the tooling concept in order to form the compliant exterior cover 82.

In addition to the compliant exterior cover 82, the thicknesses of various portions of the side tools 44, end tools 46, bottom tool 42, and top tool 48 may also change at different locations within the tooling concept. The various tools or portions of the tools or end and side tool mounts may also be formed of different materials having different coefficients of thermal expansion. As described below, forming the tooling concept 40 from different materials having different coefficients of thermal expansion allows the tooling concept to produce varying magnitudes of expansion at different locations in the tooling concept.

As can be seen in FIGS. 5–7, the exterior surfaces of the bottom, top, side and end tools and compliant exterior cover 82 are configured to produce the desired geometry of the spars 24, ribs 26, and outer skin panel 22, including the structural buildup sections 32, etc. The operation and function of the tooling concept 40 during curing of the composite workpiece used to form the wing box 20 will be described in detail below. First, the basic lay up procedure and fabrication method used to form the composite workpiece and wing box 20 will be described by reference to FIGS. 8–13.

Figure 8:
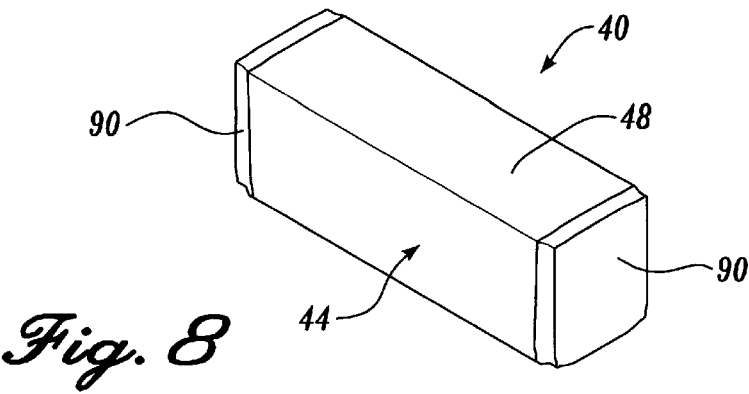
FIG. 8 is a perspective view illustrating the application of layers of composite material to the ends of the tooling concept of FIG. 5.

FIG. 8 illustrates a schematic representation of a single tooling concept 40. The first step in fabricating the composite workpiece is to cut and lay up individual layers of composite prepreg over both ends of the tooling concept 40 to form opposing end caps 90. The end caps 90 are formed by first cutting individual layers of composite prepreg to size. The layers of composite prepreg are then individually placed over the compliant exterior cover 82 and end tools 46 and formed around the ends of the compliant exterior cover 82 and end tools 46 in order to form the end caps 90. The end caps 90 are then debulked using composite fabrication techniques well known in the industry. The end caps 90 may be formed from unidirectional layers of composite prepreg, cloth layers of composite prepreg, or combinations of both unidirectional and cloth layers of prepreg.

As is best seen in FIGS. 1, 4 and 11, the end caps 90 form the ribs 26 of the wing box 20 after all the tools are assembled and the resulting workpiece is cured. In order to maintain symmetry and structural integrity, it is advantageous that each of the individual end caps 90 contains half of the layers of composite material forming each rib 26. In addition, the portions of the end caps 90 that extend inward over the sides of the end tools 46 also form the lower portion of the flanges of the ribs 26.

Figure 9:
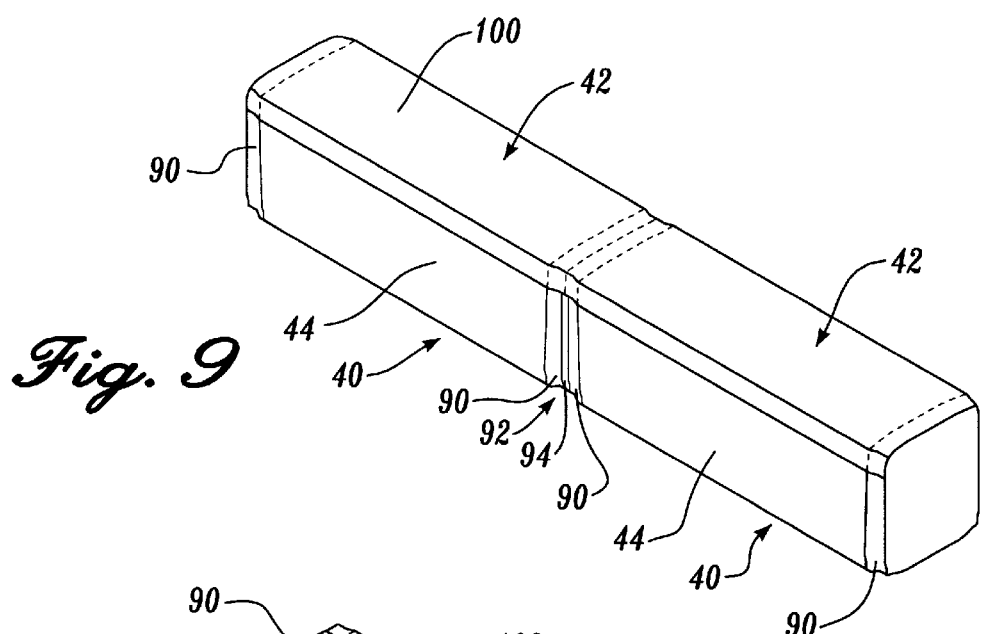
FIG. 9 is a perspective view of two adjoining tooling concepts and the application of layers of composite materials to the bottom of the adjoining tooling concepts.
Figure 10:
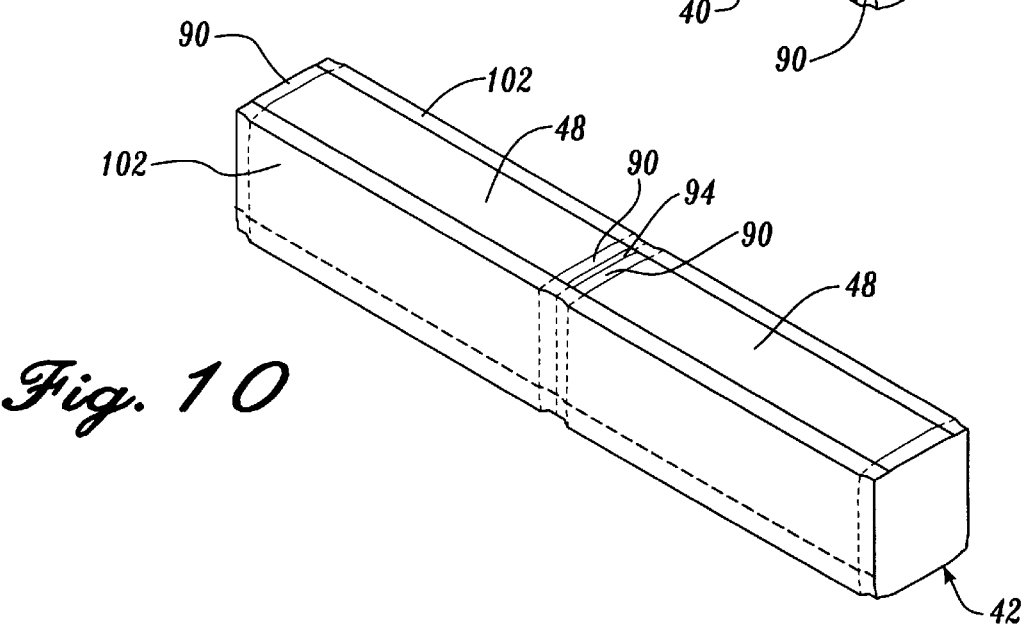
FIG. 10 is a perspective view of the application of layers of composite material to form portions of wing spars around the adjoining tooling concepts illustrated in FIG. 9.

After the formation of the end caps 90, on two tooling concepts 40 the tooling concepts 40 are placed together with their ends aligned so that the two adjoining end caps 90 contact each other and are aligned with each other. The intersection 92 between the exterior edges of the two end caps 90 form ribs 26 and are filled with a rectangular radius filler 94 in a manner well known in the art. The bottom surface of the compliant exterior cover 82 and joined tooling concepts 40 is then covered with individual layers of composite material to form a bottom U-channel 100. The bottom U-channel 100 is formed by laying up individual layers of composite material over the bottom of the joined tooling concepts and pressing the edges of the composite material around the sides of the compliant exterior cover 82 and the side tools 44 to form the legs of the U-channel. FIG. 9 illustrates the bottom U-channel 100 being formed over the joined tooling concepts 40 in an upside down position in order to assist in fabrication. After being laid up, the U-channel 100 is debulked in a manner well known in the art. As best illustrated in FIG. 3, the bottom U-channel 100 forms the interior surface of the outer skin panel 22 and also forms a portion of the structural buildup sections 32, both on the outer skin panel 22 and on the central shear webs 30.

After forming the bottom U-channel 100, two side U-channels 102 are formed by applying individual layers of composite prepreg to both sides of the compliant exterior cover 82 and the joined tooling concepts 40. As illustrated in FIG. 9, the side U-channels 102 are formed by applying individual layers of composite prepreg on the sides of the compliant exterior cover 82 and the side tools 46 and forming the layers of prepreg partially around the top and bottom tools in order to form a portion of the upper spar cap 34 and a portion of the structural buildup sections 32. As best illustrated in FIG. 3, each side U-channel 102 forms one half of the central shear web 30 and the upper legs of the U-channels 102 form the lower portion of the upper spar caps 34; and the lower legs of the U-channels 102 form the middle portion of the structural buildup sections 32. After laying up the side U-channels 102, they are debulked in a manner well known in the art.

Additional tooling concepts 40 are then joined together and layers of composite material are applied as described above. The completed tooling concepts 40 are then placed side by side on top of a prelaid up and formed outer skin panel 22 as illustrated in FIG. 11. The outer skin panel 22 is formed by laying up individual layers of composite prepreg on a skin tool 86 having the desired contour. Additional layers of composite prepreg are added to the skin panel 22 to form the pad up sections 28 on the outer skin panel 22. As illustrated in FIG. 11, the joined tooling concepts 40 are placed side by side on top of the outer skin panel 22 such that each pair of joined tooling concepts is placed on top of and in between two adjoining pad up sections 28. The gaps between the upper and lower edges of the adjoining side U-channels 102 are filled with radius fillers 106, as is well known in the art.

Figure 12:
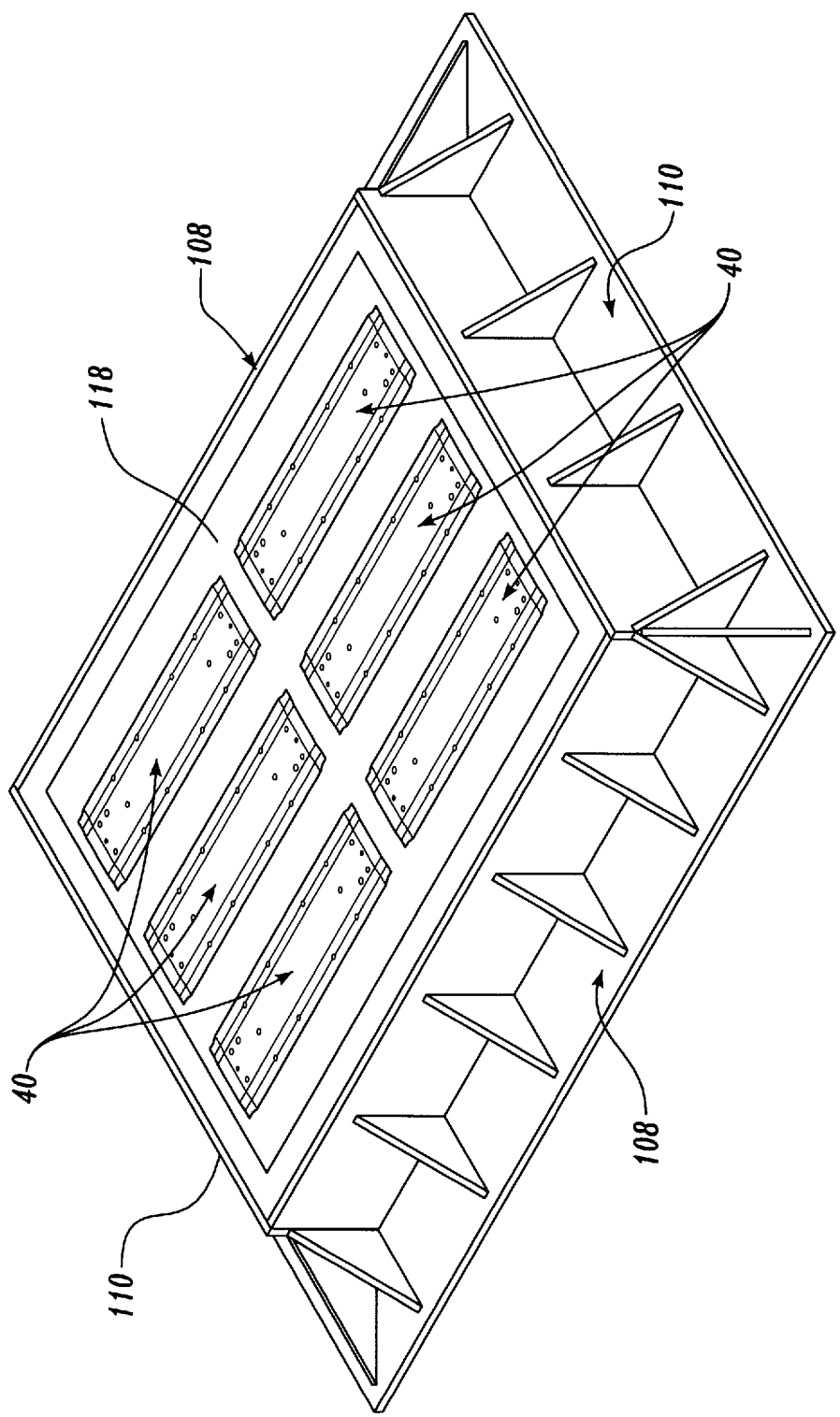
FIG. 12 is a perspective view of the completed composite workpiece and tooling used to form the wing box of FIG. 1.

After placing all of the tooling concepts 40 on the outer skin panel 22, side tools 108 and end tools 110 are placed around the sides and ends of the properly located tooling concepts 40. Each side tool 108 includes a forming surface identical to that of spars 24 (not shown) upon which side U-channels are formed in order to complete the spars 24 closest to the edges of the completed wing box 20. Similarly, the end tools 110 also include a forming surface (not shown) that imparts a shaped surface to the ends of completed wing box 20. The forming surface on the end tools 110 are placed adjacent the end caps 90 on the tooling concepts 40. After positioning the side tools 108 and end tools 110, additional layers of composite prepreg are placed over the tops of the various flanges formed by the upper flanges of the side U-channels 102 and the end caps 90 to form the cap plys 118 on the top portion of the spar caps 34 and rib caps. As shown in FIGS. 3 and 12, the cap plys 118 are placed over the top of the adjoining flanges of the adjoining side U-channels 102 and also over the top of the flanges of the end caps 90 in order to complete the composite workpiece.

Figure 13:
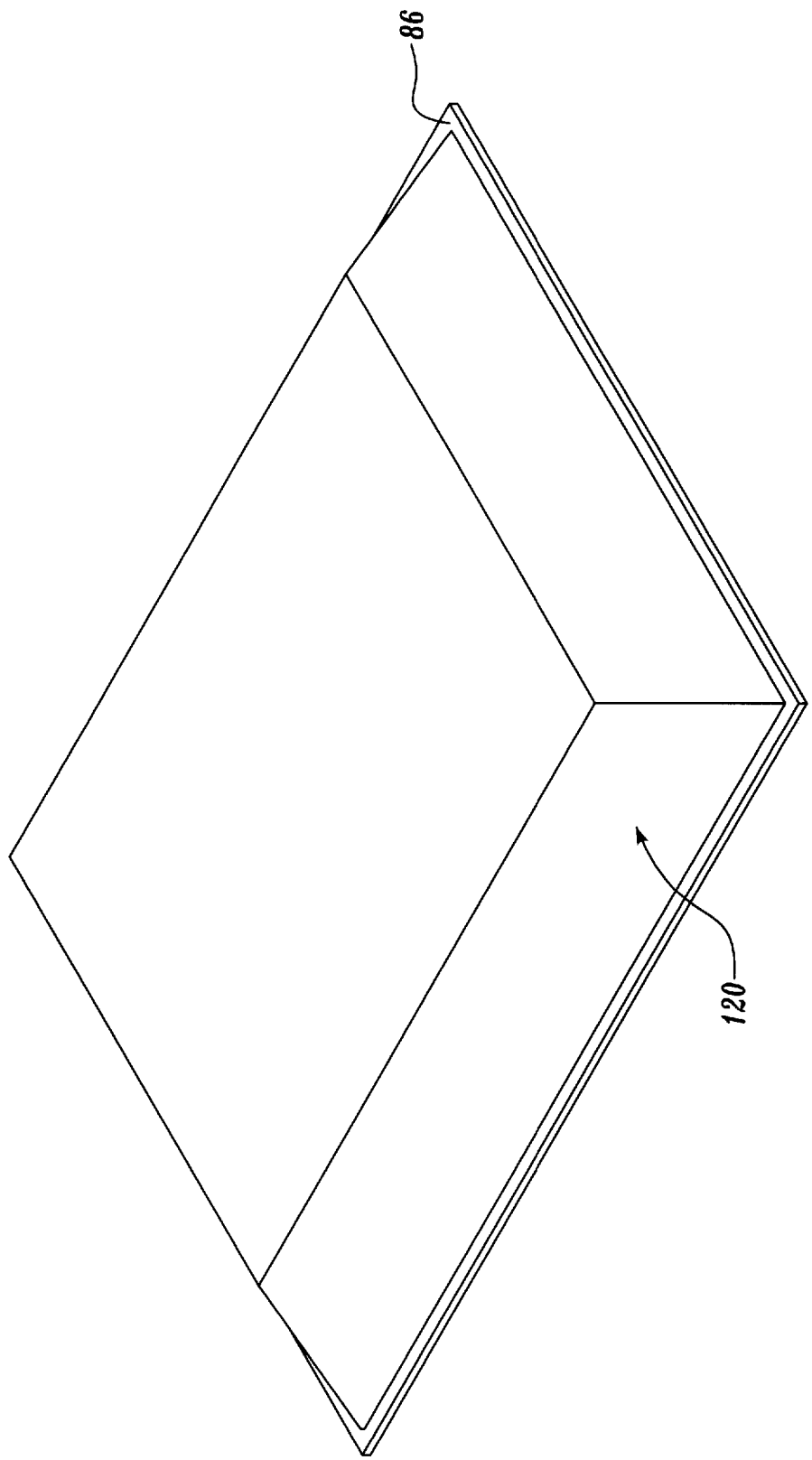
FIG. 13 is a perspective view of the covered and vacuum bagged workpiece of FIG. 12.

As best illustrated in FIGS. 11–13, the entire assembly, consisting of the formed tooling concepts 40, outer skin panel 22, and side and end tools 108 and 110, rest upon the skin tool 86. After all the tools are in the proper position, caul sheets are placed over the top of the composite workpiece and cover plates are placed over the top of the side and end tools 108 and 110. It may also be advantageous to place breather plys and release plys or other materials over the top of the composite workpiece, as is well known in the art. The resulting structure is then placed within a vacuum bag 120 (FIG. 13) which is sealed to the skin tool 86 in a manner well known in the art. The interior of the vacuum bag is connected to an autoclave vacuum pump, and the composite workpiece and associated tooling is placed within the autoclave. The processing parameters and processing conditions for curing the composite workpiece differ depending upon the composite material used to form the workpiece and are easily ascertained by those of ordinary skill in the art.

Figure 14:
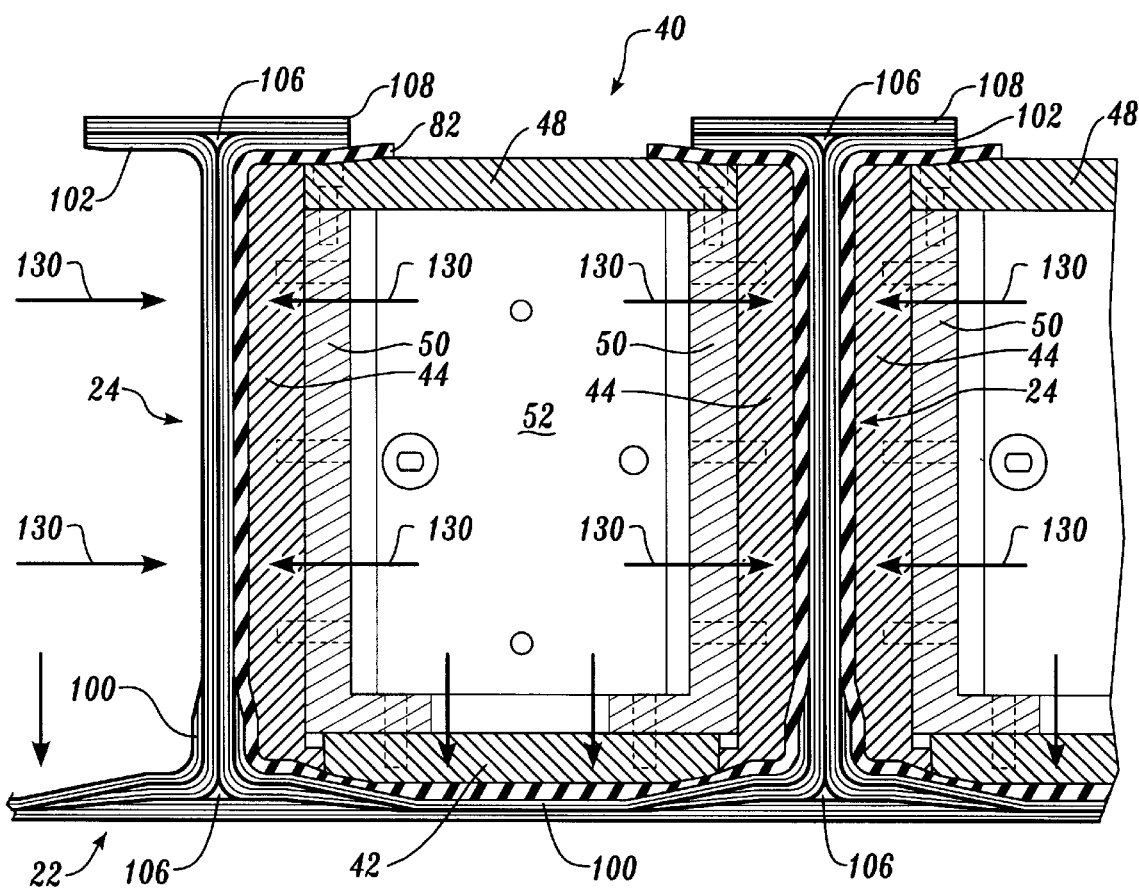
FIG. 14 is an enlarged cross-section of a portion of the composite workpiece and associated tooling used to form the wing box of FIG. 1.

The fabrication and operation of the tooling concept 40 during curing of the composite workpiece will now be described in more detail by reference to FIG. 14. As discussed briefly above, it is possible to analytically predict both the preconsolidated dimensions of the composite workpiece used to form the wing box 20 and the consolidated and cured geometry of the formed wing box. Using this information, in accordance with the present invention, the configuration of the tooling concepts 40 can be determined. Knowing the preimposed consolidated geometries of the composite workpiece, the tooling concepts 40 are configured and fabricated of appropriate materials having appropriate coefficients of thermal expansion to produce the varying magnitudes of expansion desired to result in complete consolidation of the composite workpiece used to form the composite wing box 20.

For example, in the preferred method of the invention, the composite wing box 20 is designed based upon the structural loads that the wing box is intended to carry. Using this design, a geometric model of the wing box 20 is then produced based upon known cured thicknesses of the composite materials used to form the wing box. Another geometric model based upon the thicknesses of the composite materials prior to consolidation is then calculated thus creating a geometric model of the unconsolidated and uncured composite workpiece. Next, the cure cycle used for the composite materials from which the wing box is fabricated is analyzed to determine the temperature at which the resin within the composite material undergoes resin gelation. The difference between the resin gelation temperature of the composite resin and the room temperature at which the tooling concept will be used is then calculated. This provides the difference in temperature to be used along with the coefficients of thermal expansion of the various materials from which the tooling is to be formed to produce a configuration for the tooling concept.

Using the difference in temperature and known coefficients of thermal expansion, the tooling is configured to produce the desired expansion characteristics that will result in the desired consolidation pressures as various areas of different thickness in the composite workpiece. In addition, the thermal expansion characteristics of the compliant exterior covering 82 during expansion of the tooling concept is also taken into account. The compliant nature of the exterior covering 82 helps to even out pressure peaks or valleys to produce the desired consolidation pressures at the various areas in the composite material. The expansion characteristics of the tooling concept can be determined using either analytical calculations or, in more complex tooling configurations, through the use of 2-D or 3-D linear or nonlinear finite element analysis.

For example, in the preferred embodiment, the tooling concept 40 is configured using the difference in temperature and known coefficients of thermal expansion of the tooling materials and compliant exterior covering 82 to produce a tooling concept that results in the desired magnitudes of tooling expansion to properly consolidate both the thinner areas of the workpiece in the central shear webs 30 and also the thicker areas of the workpiece in the region of the structural buildup sections 32. Thus, the tooling concept 40 in the preferred embodiment shown produces greater magnitudes of expansion to debulk and consolidate the added layers of composite material in the structural buildup sections 32 than it does in the thinner central shear webs 30.

The compliant exterior covering 82 also assists the invention in the production of approximately a hydrostatic force on the various areas of the composite workpiece. As illustrated in FIG. 14, during curing and consolidation, the compliant exterior covering 82 is able to expand or be compressed at various regions in the tooling in order to produce approximately a constant consolidation force over its entire surface. The compliant nature of the silicone rubber or other material from which the compliant exterior covering 82 is formed assists the tooling concept 40 in producing approximately a hydrostatic force throughout the tooling concept.

In addition to carefully designing the tooling concept 40 to account for the thermal expansion characteristics desired to achieve the proper part tolerances, it is also important to balance the consolidation pressures produced by the various tooling concepts across the various portions of the composite workpiece. For example, as illustrated in FIG. 14, it is important that each of the tooling concepts 40 apply approximately the same magnitude of consolidation pressure to each side of the spars 24 as illustrated by arrows 130. Matching the overall magnitude of consolidation force applied across the composite workpiece at various locations throughout the workpiece, ensures that the various portions of the composite workpiece, such as the spars 24, will be maintained in the proper position throughout the consolidation and curing of the composite workpiece to form the wing box 20. Unlike prior tooling concepts, the tooling concepts 40 are free to float and are not anchored to external frames or addition tools. The tools can be allowed to float because they are configured to produce matched forces on both sides of the various areas of the workpiece. Because the forces produced by the tooling concepts are matched on both sides of the workpiece, for example the central shear web 30, the web remains in the proper position during consolidation and curing.

In order to produce the varying magnitudes of thermal expansion desired in more complex composite parts, the various tools used to form the tooling concepts 40 may have varying thicknesses and may be formed from different materials. For example, in the present invention, the lower portions of the side tools may be thicker or thinner than the rest of the tool depending upon the application to produce a greater or lesser degree of thermal expansion in the region of the structural buildup sections 32. Alternatively, the compliant exterior covering 82 may also be formed having varying thicknesses at different locations in order to intensify or decrease the magnitude of the consolidation force provided by expansion of the compliant covering 82. As described above, the most accurate way to predict tool expansion is through the use of a 2-D or 3-D finite element model.

In the preferred embodiment, the tooling concepts 40 are hollow and are formed from separate bottom, side, end and top tools 42, 44, 46 and 48. Unlike the use of solid tools, the tooling concept 40 allows the various portions of the tools to be formed of differing materials having different thicknesses. In addition, the tooling concept 40 allows the magnitudes of expansion at different locations within the tooling to differ, thus producing some of the advantages of the present invention. The use of the compliant covering 82 also allows the expansion of the tooling concept to be tailored to account for varying levels of thermal expansion in different parts of the tooling concept. In addition, the compliant nature of the compliant exterior covering 82 helps to equalize the pressures applied by the tooling over the surface of the composite workpiece thus helping to produce a hydrostatic pressure.

As discussed briefly above, in order to obtain high quality composite parts and help to eliminate areas of resin richness or resin porosity, it is important to apply proper consolidation pressures throughout the surface of the workpiece. However, it is also important to carefully maintain the tolerances of the various surfaces and positions of the various parts of the composite workpiece. The tooling concept used in the present invention allows both these goals to be achieved through the use of multiple materials having differing thermal expansion characteristics.

While the preferred embodiment of the invention has been illustrated and described, it will be apparent that various changes can be made therein without departing from the spirit and scope of the invention. For example, various materials can be used in the fabrication of tooling concepts according to the invention. In addition, the geometry and general configuration of the tooling concepts can change depending upon the applications and geometries of the composite workpieces being produced.

The embodiments of the invention in which an exclusive property or privilege is claimed are defined as follows:

1. A method of forming a composite part from a composite prepreg material, the composite part having varying numbers of layers of the composite prepreg material at different locations within the composite part, the method comprising:

(a) determining a desired geometry for the composite part;

(b) calculating an unconsolidated geometry of the unconsolidated and uncured composite prepreg material used to form the composite part;

(c) determining a resin gelation temperature of the composite prepreg material from which the composite part is to be formed;

(d) determining a temperature difference between the resin gelation temperature and a temperature at which the composite part is to be laid up;

(e) using the temperature difference and known coefficients of thermal expansion, configuring a tooling concept covered on an exterior surface with a compliant covering having varying thicknesses at different locations within the complaint covering so that the varying thicknesses and thermal expansion characteristics of the compliant covering match the thermal expansion characteristics, varying numbers of layers, and geometry of the composite prepreg material such that the compliant covering extends adjacent to and against the unconsolidated and uncured composite prepreg material and expands to the resin gelation temperature so as to maintain contact with and apply a substantially even pressure across the composite part during curing of the composite part; and (f) using the tooling concept to lay up and cure the composite prepreg material to form the composite part.

2. The method of claim 1, further comprising configuring the tooling concept so that some areas of the tooling concept expand more than other areas of the tooling concept during curing of the composite prepreg material.

3. The method of claim 1, further comprising configuring the tooling concept from several different tools so that the tooling concept is hollow.

4. The method of claim 1, wherein the compliant material comprises silicone rubber.

5. The method of claim 1, further comprising configuring the tooling concept from multiple tooling materials having different coefficients of thermal expansion.

6. The method of claim 1, further comprising modeling the tooling concept using finite element analysis in order to determine the thermal expansion characteristics of the tooling concept during curing of the composite prepreg material.

7. The method of claim 1, further comprising allowing the tooling concept to float during curing of the composite workpiece.

8. The method of claim 1, further comprising forming the tooling concept from at least one material having a relatively high coefficient of thermal expansion and from at least one other material having a much lower coefficient of thermal expansion.

9. The method of claim 8, further comprising forming the tooling concept from at least one flexible material and from at least one rigid material.

* * * * *